United States Patent
Kniffler

(10) Patent No.: US 7,020,730 B2
(45) Date of Patent: Mar. 28, 2006

(54) METHOD FOR OPERATING A MICROPROCESSOR CONFIGURATION AND MICROPROCESSOR CONFIGURATION

(75) Inventor: Oliver Kniffler, München (DE)

(73) Assignee: Infineon Technologies AG, Munich (DE)

( * ) Notice: Subject to any disclaimer, the term of this patent is extended or adjusted under 35 U.S.C. 154(b) by 89 days.

(21) Appl. No.: 10/199,589

(22) Filed: Jul. 19, 2002

(65) Prior Publication Data

US 2003/0005206 A1 Jan. 2, 2003

Related U.S. Application Data

(63) Continuation of application No. PCT/DE01/00155, filed on Jan. 16, 2001.

(30) Foreign Application Priority Data

Jan. 19, 2000 (EP) .................................. 00100994

(51) Int. Cl.
*G06F 13/14* (2006.01)
*G06F 12/14* (2006.01)

(52) U.S. Cl. ....................... 710/305; 713/189

(58) Field of Classification Search ........ 713/187–194, 713/200
See application file for complete search history.

(56) References Cited

U.S. PATENT DOCUMENTS

| 5,297,201 | A | * | 3/1994 | Dunlavy | 380/252 |
| 5,341,423 | A | * | 8/1994 | Nossen | 380/252 |
| 5,754,647 | A | | 5/1998 | Hsu | |
| 6,295,606 | B1 | * | 9/2001 | Messerges et al. | 713/189 |
| 6,327,661 | B1 | * | 12/2001 | Kocher et al. | 713/193 |
| 6,385,727 | B1 | * | 5/2002 | Cassagnol et al. | 713/193 |
| 6,401,208 | B1 | * | 6/2002 | Davis et al. | 713/193 |
| 6,419,159 | B1 | * | 7/2002 | Odinak | 235/492 |
| 6,625,737 | B1 | * | 9/2003 | Kissell | 713/300 |
| 6,633,981 | B1 | * | 10/2003 | Davis | 713/189 |
| 6,658,569 | B1 | * | 12/2003 | Patarin et al. | 713/194 |

FOREIGN PATENT DOCUMENTS

GB 2 119 978 A 11/1983

OTHER PUBLICATIONS

Author not listed: "Soft Microcontroller", Dallas Semiconductor Corp., Oct. 6, 1993, pp. 1-3, 7, 8, 73, 77-80, 82, 182-156, 229, 290-292.

* cited by examiner

*Primary Examiner*—Glenn A. Auve
*Assistant Examiner*—Nimesh Patel
(74) *Attorney, Agent, or Firm*—Laurence A. Greenberg; Werner H. Stemer; Ralph E. Locher

(57) ABSTRACT

A microprocessor configuration includes a central control and processing unit, a bus having a bus state line and data/address lines, and units connected to the bus. If none of the units is being addressed by the control and processing unit, random data values are transmitted on the data/address lines. Such a process and configuration masks the current profile of the microprocessor configuration with regard to the useful information to be transmitted through the bus.

9 Claims, 1 Drawing Sheet

METHOD FOR OPERATING A MICROPROCESSOR CONFIGURATION AND MICROPROCESSOR CONFIGURATION

CROSS-REFERENCE TO RELATED APPLICATION

This application is a continuation of copending International Application No. PCT/DE01/00155, filed Jan. 16, 2001, which designated the United States and was not published in English.

BACKGROUND OF THE INVENTION

Field of the Invention

The invention relates to a method for operating a microprocessor configuration having a first and a further unit, a bus, through which the units are connected to one another having a line for a state signal and lines for further bus signals, and a bus control unit for controlling accesses of the first unit to the further unit. In addition, the invention relates to a microprocessor configuration that is suitable for carrying out the method.

Microprocessor configurations include, besides the central processing and control unit (CPU), further units such as memories or peripheral units for signal inputting and signal outputting integrated on a single chip, so-called microcontrollers. Such microcontrollers can be used in security-relevant systems, for example, smart cards. In such a case, the microcontroller serves, inter alia, to encrypt the data traffic between a read device and the smart card, to check access authorizations, and to execute other secret operations.

For covertly discovering the function of the microcontroller, those skilled in the art know to use the temporal sequence of the current consumed by the microcontroller. Trigger points, for example, can be obtained from the current profile to control subsequent measurements in a correctly timed manner. It is also possible to draw conclusions about the specific type of calculation and encryption/decryption algorithms used in the processor. It is even possible to determine parts of the processed useful information. Bus accesses especially generate a characteristic current profile because they proceed according to a defined signal protocol and the switching operations yield a clear current profile due to the high capacitive loads to be driven. The application of conventional microcontrollers in security-critical applications is, therefore, problematic.

SUMMARY OF THE INVENTION

It is accordingly an object of the invention to provide a method for operating a microprocessor configuration and microprocessor configuration that overcomes the hereinafore-mentioned disadvantages of the heretofore-known devices and methods of this general type and that operates a microprocessor configuration that is monitor-proof.

With the foregoing and other objects in view, there is provided, in accordance with the invention, a method for operating a microprocessor configuration, including the steps of connecting a first unit through a bus to a second unit, the bus having a line for conveying a state signal specifying an operating state of the bus and lines for conveying bus signals specifying at least one data value, connecting a bus control unit to the line, controlling access of the first unit to the second unit through the bus with the bus control unit, and when the bus control unit communicates through the line that no access is being carried out by the first unit to the second unit, generating a data value under random control and applying the data value to the lines as the bus signals.

With the objects of the invention in view, there is also provided a microprocessor configuration including a first unit, a second unit, a bus connecting the first unit to the second unit, the bus having operating states, a line for conveying a state signal specifying at least one of the operating states, and lines for conveying bus signals specifying at least one data value, a bus control unit adapted to control accesses of the first unit to the second unit through the bus, the bus control unit connected to the line, and a random number generator connectable to the lines and adapted to supply the bus signals when the state signal indicates no access is to be carried out by the first unit to the second unit.

The bus state signal indicates the task for which the bus is currently being used by the central processing and control unit (CPU). If the bus is actually in the idle state in the clock section considered, no valid signals are present on the bus data lines. According to the invention, a signal generated in a randomly controlled manner is then transmitted through the data lines of the bus, which randomly alters the current profile. The current profile is, thus, masked with regard to the useful information transmitted through the bus so that conclusions about the useful information based upon a statistical evaluation of the current profile are made significantly more difficult or even impossible.

According to the bus protocol, it may be provided that the bus state signal specifies the state of the bus lines one clock cycle in advance. It is also possible for the bus state signal to specify the state of the remaining bus lines in the same clock cycle.

In accordance with another mode of the invention, the state signal and the data value are clock-cyclically generated with the bus control unit, and, when it is communicated in a first clock cycle that no access is being carried out by the first unit to the further unit, in a subsequent clock cycle, the data value is generated and applied to the lines as the bus signals.

The units that can be driven by the CPU are assigned addresses. If the CPU outputs, by the bus control unit, an address assigned to a memory or a peripheral unit, this means that the memory and a memory cell contained therein or the corresponding peripheral unit is to be activated to receive data from the bus or to output data onto the bus. In the case of the invention, when the CPU effects no access to a unit connected to the bus, an address is, nevertheless, output onto the bus. However, this address is not an address that is assigned to a unit connected to the bus, but rather an arbitrary other address. The consequence of such a process is that none of the connected units is activated. However, the arbitrary address is, nevertheless, transmitted through the bus and a corresponding current profile is thereby generated. The address is generated in a randomly controlled manner. The current profile is, accordingly, randomly altered. It is must be ensured that the random number does not correspond to a valid address of a unit connected to the bus.

The data value that is output onto the bus in this way acquires the significance of an address through the respective state of the bus state signal. The bus state signal furthermore indicates that, on the data lines of the bus, either an address is output or a datum is output (written) to the addressed unit or received (read) from the addressed unit. The same signal lines of the bus can be used for the addresses and the data to be read or to be written. Such a process is referred to as a multiplexed data/address bus. The term data value is to be understood generally and includes data values that represent an address or data or program instructions that are currently to be processed, etc. Once the bus state signal has indicated that an idle state is present, a random value is transmitted in the subsequent clock cycle. If an address for which no unit connected to the bus exists is transmitted, in the subsequent operating clock cycles random values are transmitted until an existing unit is addressed again by a valid address. In contrast, in the case of previous microprocessors, an address that was not assigned to any connected unit represented a programming error. In the case of the invention, however, the transmission of such a randomly controlled address is to be understood to the effect that an access to a nonexistent destination is being executed to mask the otherwise unused bus cycles.

In accordance with a further mode of the invention, the a first address is assigned to the second unit by which the second unit can be accessed by the first unit, and, in the subsequent clock cycle after the first clock cycle in which there is a communication that no access is being carried out by the first unit to the second unit, a second address different from the first address is applied to the lines as the bus signals.

In accordance with an added mode of the invention, one of a read access and a write access is executed through the bus in a clock cycle following the subsequent clock cycle.

In accordance with an additional mode of the invention, the state signal includes signal states for a read access and a write access, one of the signal states is applied on the line as the state signal, and a data value generated under random control is applied in an assigned manner to the lines as the bus signals.

The bus of the microprocessor configuration may additionally include a line for an enable signal that is passed to the further units connected to the bus. The enable signal communicates to these units that an access is effected through the bus. The enable line, too, is expediently driven with random values after an idle state signaled by the bus state signal.

In accordance with yet another mode of the invention, the bus has a line for an enable signal of the second unit, and a signal generated under random control is applied to the line for the enable signal when the bus control unit communicates through the line for the state signal that no access is being carried out by the first unit to the second unit.

In accordance with a concomitant feature of the invention, a microprocessor includes at least one of the first unit and the second unit, the first unit is a processing and control unit of the microprocessor, and the second unit is a unit selected from the group consisting of a peripheral unit of the microprocessor for inputting and outputting signals from and to the microprocessor and a memory.

Other features that are considered as characteristic for the invention are set forth in the appended claims.

Although the invention is illustrated and described herein as embodied in a method for operating a microprocessor configuration and microprocessor configuration, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
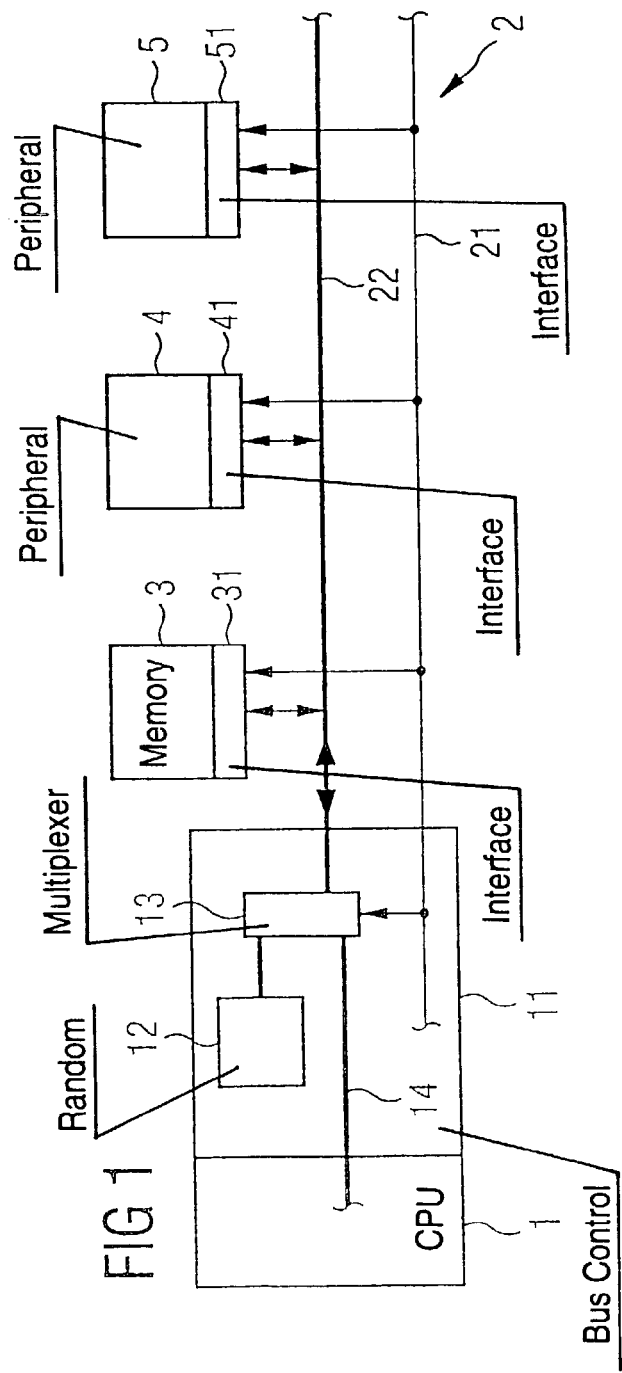
FIG. 1 is a block circuit diagram of the configuration according to the invention with elements of a microprocessor relevant to the invention.

Referring now to the figures of the drawings in detail and first, particularly to FIG. 1 thereof, there is shown a microcontroller including a central control and processing unit (CPU) 1, which controls the internal operating sequences, in particular, the accesses to the bus 2. For such a purpose, the CPU 1 includes a bus control unit 11. The bus itself includes at least one signal line 21, which specifies the bus state, and a multiplicity of lines 22, through which both addresses of connected units and data values are successively transmitted, a so-called multiplexed data/address bus. Connected to the bus 2 is a memory 3, in which data values and/or program instructions to be processed are stored. Furthermore, a first peripheral unit 4 is provided and also a second peripheral unit 5, through which data are exchanged with non-illustrated functional units connected off-chip. The microcontroller is employed, for example, in a smart card to communicate with a read device. Each of the units 3, 4, 5 connected to the bus has a bus interface 31, 41, and 51, respectively. The bus control unit 11 and the interfaces 31, 41, 51 cooperate in master-slave dependence.

If the bus 2 is in the idle state, i.e., none of the connected units 3, 4, 5 is activated by the CPU 1 for an access, then the bus control unit 11 outputs onto the data lines 22 a sequence of data values generated in a randomly controlled manner. A random number generator 12, which is connected to the data lines 22 of the bus through a multiplexer 13, serves for generating the random data values. If one of the units 3, 4, 5 is addressed by the CPU 1, the multiplexer 13 changes over to the other terminal 14, which forwards the transmitted or received data to the further functional units of the CPU 1.

Figure 2:
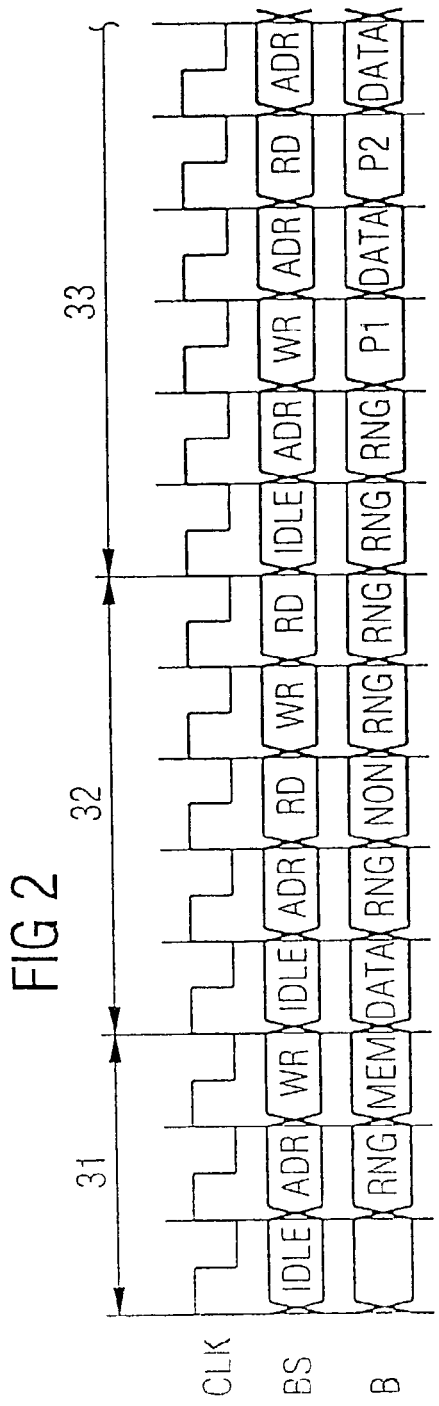
FIG. 2 is a signal timing diagram according to the invention.

The bus state signal BS, which is transmitted on the line 21, is illustrated in FIG. 2 together with the data values B transmitted on the data/address lines 22. The bus is operated clock-cyclically, so that respective signal states are valid for one clock period of the clock signal CLK. The bus state signal BS can assume the state IDLE for the idle state, the state ADR for the transmission of an address, the state WR for a write operation, in which a datum is transmitted from the CPU 1 to one of the units 3, 4, 5, and a state RD for a read operation, in which a data value is read from one of the units 3, 4, 5 and transmitted to the CPU 1. The bus is controlled such that the state of the signal BS in a first clock cycle specifies the state assumed by the data values of the data/address lines B in the subsequent next clock cycle. This means that the data values transmitted through the address/data lines 22 correspond to the state of the bus state signal BS that was transmitted directly one clock cycle previously.

The first three clock cycles 31 show the signal sequence in the case of a write access to the memory 3. The bus is in the idle state in the first clock cycle, the bus state signal BS assuming the signal value IDLE. In the subsequent operating clock cycle, a data value RNG generated in a randomly controlled manner by the random number generator 12 is transmitted through the data/address lines 22. In the subsequent clock cycle, the bus state signal BS, from the bus master 11, is changed over to the state ADR for the address transmission. This means, for the data/address signal line 22 of the bus, that a valid address MEM of a memory cell contained in the memory 3 is transmitted. Afterward, the bus state signal BS signals a write operation WR. The bus lines 22 then carry the data value DATA that is to be stored in the memory 3 at the memory cell with the address MEM specified in the clock cycle before.

Afterward, the CPU 1 does not access any of the units 3, 4 or 5 for five clock cycles. In this respect, firstly the state IDLE is transmitted for one clock cycle for the bus state signal BS. A random data value RNG is output on the data/address lines 22 of the bus in the directly succeeding clock cycle. The bus state signal BS subsequently signals the transmission of an address by the state ADR. A data value NON, which corresponds to none of the addresses in the address space of the units 3, 4, and 5, is then transmitted on the data/address lines 22. The data value NON is generated in a randomly controlled manner in the random number generator 12. From a programming standpoint, this means that a unit is addressed with the address NON, which does not exist in real hardware. The bus state signal BS subsequently assumes the signal states RD, WR, and RD. Random values RNG generated by the random number generator 12 are transmitted in the associated clock sections for the address/data signal lines 22. In practice, there may be far more than only the three clock sections shown by way of example with the transmission of random number values on the address/data signal lines.

Afterward, the bus state signal BS is again changed over to an idle state IDLE, a random value RNG being transmitted on the address/data lines. Afterward, a write access is made to the peripheral unit 4 with the address P1 and a read access is made to the peripheral unit 5 with the address P2.

In the case of the invention, a random data value is output on the data/address lines 22 of the bus 2 when the CPU 1 requests no access to one of the connected peripheral units 3, 4, or 5. This is the case when the bus state signal BS indicates that an idle state is present (IDLE), or a unit has been addressed that is assigned to none of the connected units, in order subsequently to output onto the bus data values generated in a randomly controlled manner during a bus signal state WR or RD. The current profile of the microcontroller is masked in this way.

I claim:

1. A method for operating a microprocessor configuration, which comprises:
   connecting a first unit through a bus to a second unit, the bus having:
      a state signal line for conveying a state signal specifying an operating state of the bus; and
      lines for conveying bus signals specifying at least one data value;
   connecting a bus control unit to the state signal line;
   assigning at least one address to the second unit, the second unit being activated by the at least one address;
   controlling access of the first unit to the second unit through the bus with the bus control unit; and
   when the bus control unit communicates through the state signal line that no access is being carried out by the first unit to the second unit, generating a data value under random control and applying the data value to the lines as the bus signals, the data value generated not corresponding to any valid second unit address and no memory address being accessed as a result of the random control.

2. The method according to claim 1, which further comprises:
   clock-cyclically generating the state signal and the data value with the bus control unit; and
   when it is communicated in a first clock cycle that no access is being carried out by the first unit to the second unit, in a subsequent clock cycle, generating the data value and applying the data value to the lines as the bus signals.

3. The method according to claim 2, which further comprises:
   assigning a first address to the second unit by which the second unit can be accessed by the first unit; and
   in the subsequent clock cycle after the first clock cycle in which there is a communication that no access is being carried out by the first unit to the second unit, applying a second address different from the first address to the lines as the bus signals.

4. The method according to claim 3, which further comprises executing one of a read access and a write access through the bus in a clock cycle following the subsequent clock cycle.

5. The method according to claim 4, wherein the state signal includes signal states for a read access and a write access; and which further comprises:
   applying one of the signal states on the state signal line as the state signal; and
   applying a data value generated under random control in an assigned manner to the lines as the bus signals.

6. The method according to claim 5, wherein the bus has an enable line for an enable signal of the second unit, and which further comprises applying a signal generated under random control to the enable line for the enable signal when the bus control unit communicates through the state signal line for the state signal that no access is being carried out by the first unit to the second unit.

7. A microprocessor configuration, comprising:
   a first unit;
   a second unit having at least one address associated with said second unit and being activated by said at least one address;
   a bus connecting said first unit to said second unit, said bus having:
      operating states;
      a state signal line for conveying a state signal specifying at least one of said operating states; and
      lines for conveying bus signals specifying at least one data value different from said at least one address;
   a bus control unit adapted to control accesses of said first unit to said second unit through said bus, said bus control unit connected to said state signal line; and
   a random number generator connectable to said lines and adapted to supply said bus signals when said state signal indicates no access is to be carried out by said first unit to said second unit, said random number generator supplying said at least one data value under random control to said lines, said at least one data value not corresponding to any valid second unit address and no memory address being accessed as a result of the random control.

8. The microprocessor configuration according to claim 7, wherein:
  a microprocessor includes at least one of said first unit and said second unit;
  said first unit is a processing and control unit of said microprocessor; and
  said second unit is a unit selected from the group consisting of:
    a peripheral unit of said microprocessor for inputting and outputting signals from and to said microprocessor; and
    a memory.

9. The microprocessor configuration according to claim 7, wherein:
  said bus control unit communicating through said state signal line that no access is being carried out by said first unit to said second unit; and
  when said bus control unit communicates through said state signal line that no access is being carried out by said first unit to said second unit, said bus control unit generating said data value under random control and applying said data value to said lines as said bus signals.

* * * * *